United States Patent
Yoon et al.

(10) Patent No.: US 12,476,683 B2
(45) Date of Patent: Nov. 18, 2025

(54) WIRELESS COMMUNICATION DEVICE FOR TRANSMITTING AND RECEIVING REFERENCE SIGNALS AND OPERATING METHOD THEREOF

(71) Applicant: Samsung Electronics Co., Ltd., Suwon-si (KR)

(72) Inventors: Hongsik Yoon, Suwon-si (KR); Jungmin Park, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 451 days.

(21) Appl. No.: 17/939,200

(22) Filed: Sep. 7, 2022

(65) Prior Publication Data
US 2023/0079252 A1    Mar. 16, 2023

(30) Foreign Application Priority Data

Sep. 7, 2021 (KR) .................. 10-2021-0118961
Jun. 23, 2022 (KR) .................. 10-2022-0077084

(51) Int. Cl.
*H04B 7/06* (2006.01)
*H04L 25/02* (2006.01)
*H04B 17/309* (2015.01)

(52) U.S. Cl.
CPC ....... *H04B 7/0626* (2013.01); *H04L 25/0224* (2013.01); *H04B 17/309* (2015.01); *H04L 25/0202* (2013.01)

(58) Field of Classification Search
CPC ............... H04B 7/0621; H04B 7/0626; H04B 17/0417; H04B 17/0632; H04B 17/0643;
(Continued)

(56) References Cited

U.S. PATENT DOCUMENTS 9,882,624 B2    1/2018    Abraham et al.
10,425,142 B2    9/2019    Park et al.
(Continued)

FOREIGN PATENT DOCUMENTS

EP        3605924 A1       2/2020
WO    WO-2020028774 A1 *   2/2020    ........... H04L 5/0051
WO    WO-2024233836 A1 *  11/2024    ......... H04B 7/06952

OTHER PUBLICATIONS

EP Search Report for corresponding EP Patent Application No. 22194148.7 issued on Feb. 16, 2023.
(Continued)

*Primary Examiner* — Warner Wong
(74) *Attorney, Agent, or Firm* — Harness, Dickey & Pierce, P.L.C.

(57) ABSTRACT

An operating method of a user equipment (UE) includes receiving channel state information-reference signal (CSI-RS) configuration information from a base station including time and frequency location information of a first CSI-RS, the first CSI-RS corresponding to a first density value of 0.5, 1 or 3, determining whether to request a second CSI-RS having a second density value based on a channel characteristic, the second density value being different from the first density value, and the channel characteristic corresponding to a channel between the UE and the base station, transmitting a request message to the base station in response to determining to request the second CSI-RS, receiving the second CSI-RS from the base station based on the CSI-RS configuration information, the second CSI-RS being based on the request message, estimating the channel based on the second CSI-RS, and transmitting a CSI-RS report to the base station based on the channel estimate.

20 Claims, 14 Drawing Sheets

(58) Field of Classification Search
CPC ........ H04B 17/309; H04B 3/46; H04B 10/07;
H04B 10/0773; H04B 10/0775; H04L
25/02; H04L 25/0202; H04L 25/0224;
H04L 2025/03783; H04L 2025/03796;
H04L 27/261; H04L 27/263; H04L
1/0687; H04L 1/0693; H04L 1/0026;
H04L 25/024; H04W 24/00; H04W 24/10
See application file for complete search history.

(56) References Cited

U.S. PATENT DOCUMENTS

| | | | |
|---|---|---|---|
| 10,812,237 B2 | 10/2020 | Nammi et al. | |
| 10,979,892 B2 | 4/2021 | Jia et al. | |
| 11,064,567 B2 | 7/2021 | Cui et al. | |
| 11,146,370 B2 | 10/2021 | Xu et al. | |
| 2006/0146948 A1 | 7/2006 | Park et al. | |
| 2019/0036661 A1 | 1/2019 | Ko et al. | |
| 2019/0058517 A1* | 2/2019 | Kang | H04B 7/0695 |
| 2019/0199487 A1 | 6/2019 | Ko et al. | |
| 2019/0356438 A1* | 11/2019 | Lee | H04B 7/0695 |
| 2019/0372641 A1* | 12/2019 | Muruganathan | H04B 7/0456 |
| 2020/0220583 A1 | 7/2020 | Cha et al. | |
| 2020/0344030 A1 | 10/2020 | Cheng et al. | |
| 2021/0105111 A1 | 4/2021 | Yoon et al. | |
| 2022/0201663 A1* | 6/2022 | Su | H04L 5/0051 |
| 2023/0109063 A1* | 4/2023 | Wang | H04B 7/0626 370/252 |
| 2024/0137097 A1* | 4/2024 | Bhamri | H04B 7/0626 |
| 2024/0187186 A1* | 6/2024 | Echigo | H04L 5/0048 |
| 2024/0187909 A1* | 6/2024 | Hindy | H04W 24/10 |
| 2024/0340796 A1* | 10/2024 | Zhou | H04L 1/0027 |
| 2024/0406036 A1* | 12/2024 | Fakoorian | H04L 25/0226 |

OTHER PUBLICATIONS

EESR dated Jun. 5, 2023 for corresponding EP Patent Application No. 22194148.7.

Huawei et al. "Support of flexible TRS bandwidth sizes", *3rd Generation Partnership Project (3GPP)*, (Sep. 1, 2020).

3GPP5G 5G; NR; Radio Resource control (RRC); Protocol specification (3GPP TS 38.331 version 16.5.0 Release 16), ETSI TS 138 331 V16.5.0 (Sep. 2021).

3GPP5G "5G; NR; Physical channels and modulation (3GPP TS 38.211 version 16.6.0 Release 16)" 3GPP TS 38.211 version 16.6.0 Release 16, ETSI TS 138 211 V16.6.0 (Aug. 2021).

3GPP5G "5G; NR; Physical layer procdures for data (3GPP TS 38.214 version 16.6.0 Release 16)" ETSI TS 138 214 V16.6.0 (Aug. 2021).

\* cited by examiner

FIG. 7A

| Row | Ports | Density X | cdm-Type | $(\bar{k}, \bar{l})$ | CDM group index j | k' | l' |
|---|---|---|---|---|---|---|---|
| 1 | 1 | 3 | noCDM | $(k_0, l_0), (k_0+4, l_0), (k_0+8, l_0)$ | 0,0,0 | 0 | 0 |
| 2 | 1 | 1, 0.5 | noCDM | $(k_0, l_0)$ | 0 | 0 | 0 |
| 3 | 2 | 1, 0.5 | fd-CDM2 | $(k_0, l_0)$ | 0 | 0,1 | 0 |
| 4 | 4 | 1 | fd-CDM2 | $(k_0, l_0), (k_0+2, l_0)$ | 0,1 | 0,1 | 0 |
| 5 | 4 | 1 | fd-CDM2 | $(k_0, l_0), (k_0, l_0+1)$ | 0,1 | 0,1 | 0 |
| 6 | 8 | 1 | fd-CDM2 | $(k_0, l_0), (k_1, l_0), (k_2, l_0), (k_3, l_0)$ | 0,1,2,3 | 0,1 | 0 |
| 7 | 8 | 1 | fd-CDM2 | $(k_0, l_0), (k_1, l_0), (k_0, l_0+1), (k_1, l_0+1)$ | 0,1,2,3 | 0,1 | 0 |
| 8 | 8 | 1 | cdm4-FD2-TD2 | $(k_0, l_0), (k_1, l_0)$ | 0,1 | 0,1 | 0,1 |
| 9 | 12 | 1 | fd-CDM2 | $(k_0, l_0), (k_1, l_0), (k_2, l_0), (k_3, l_0), (k_4, l_0), (k_5, l_0)$ | 0,1,2,3,4,5 | 0,1 | 0 |
| 10 | 12 | 1 | cdm4-FD2-TD2 | $(k_0, l_0), (k_1, l_0), (k_2, l_0)$ | 0,1,2 | 0,1 | 0,1 |
| 11 | 16 | 1, 0.5 | fd-CDM2 | $(k_0, l_0), (k_1, l_0), (k_2, l_0), (k_3, l_0), (k_0, l_0+1), (k_1, l_0+1), (k_2, l_0+1), (k_3, l_0+1)$ | 0,1,2,3, 4,5,6,7 | 0,1 | 0 |
| 12 | 16 | 1, 0.5 | cdm4-FD2-TD2 | $(k_0, l_0), (k_1, l_0), (k_0, l_0+1), (k_1, l_0+1)$ | 0,1,2,3 | 0,1 | 0,1 |
| 13 | 24 | 1, 0.5 | fd-CDM2 | $(k_0, l_0), (k_1, l_0), (k_2, l_0), (k_0, l_0+1), (k_1, l_0+1), (k_2, l_0+1), (k_0, l_1), (k_1, l_1), (k_2, l_1), (k_0, l_1+1), (k_1, l_1+1), (k_2, l_1+1)$ | 0,1,2,3, 4,5,6,7, 8,9,10,11 | 0,1 | 0 |
| 14 | 24 | 1, 0.5 | cdm4-FD2-TD2 | $(k_0, l_0), (k_1, l_0), (k_2, l_0), (k_0, l_1), (k_1, l_1), (k_2, l_1)$ | 0,1,2,3,4,5 | 0,1 | 0,1 |
| 15 | 24 | 1, 0.5 | cdm8-FD2-TD4 | $(k_0, l_0), (k_1, l_0), (k_2, l_0)$ | 0,1,2 | 0,1 | 0,1,2,3 |
| 16 | 32 | 1, 0.5 | fd-CDM2 | $(k_0, l_0), (k_1, l_0), (k_2, l_0), (k_3, l_0), (k_0, l_0+1), (k_1, l_0+1), (k_2, l_0+1), (k_3, l_0+1), (k_0, l_1), (k_1, l_1), (k_2, l_1), (k_3, l_1), (k_0, l_1+1), (k_1, l_1+1), (k_2, l_1+1), (k_3, l_1+1)$ | 0,1,2,3, 4,5,6,7, 8,9,10,11, 12,13,14,15 | 0,1 | 0 |
| 17 | 32 | 1, 0.5 | cdm4-FD2-TD2 | $(k_0, l_0), (k_1, l_0), (k_2, l_0), (k_3, l_0), (k_0, l_1), (k_1, l_1), (k_2, l_1), (k_3, l_1)$ | 0,1,2,3,4,5,6,7 | 0,1 | 0,1 |
| 18 | 32 | 1, 0.5 | cdm8-FD2-TD4 | $(k_0, l_0), (k_1, l_0), (k_2, l_0), (k_3, l_0)$ | 0,1,2,3 | 0,1 | 0,1,2,3 |

FIG. 7B

| Row | Ports | Density X | cdm-Type p | $(\bar{k},\bar{l})$ | CDM group index j | k' | l' |
|---|---|---|---|---|---|---|---|
| 19 | 2 | 3 | fd-CDM2 | $(\bar{k}_0, \bar{l}_0), (\bar{k}_0+4, \bar{l}_0), (\bar{k}_0+8, \bar{l}_0)$ | 0,0,0 | 0,1 | 0 |
| 20 | 4 | 3 | fd-CDM2 | $(\bar{k}_0, \bar{l}_0), (\bar{k}_0+4, \bar{l}_0), (\bar{k}_0+8, \bar{l}_0)$ $(\bar{k}_0, \bar{l}_1), (\bar{k}_0+4, \bar{l}_1), (\bar{k}_0+8, \bar{l}_1)$ | 0,0,0,1,1,1 | 0,1 | 0 |
| 21 | 8 | 3 | fd-CDM2 | $(\bar{k}_0, \bar{l}_0), (\bar{k}_0+4, \bar{l}_0), (\bar{k}_0+8, \bar{l}_0)$ $(\bar{k}_0, \bar{l}_1), (\bar{k}_0+4, \bar{l}_1), (\bar{k}_0+8, \bar{l}_1)$ $(\bar{k}_0, \bar{l}_2), (\bar{k}_0+4, \bar{l}_2), (\bar{k}_0+8, \bar{l}_2)$ $(\bar{k}_0, \bar{l}_3), (\bar{k}_0+4, \bar{l}_3), (\bar{k}_0+8, \bar{l}_3)$ | 0,0,0,1,1,1, 2,2,2,3,3,3 | 0,1 | 0 |
| 22 | 8 | 3 | cdm4-FD3-TD2 | $(\bar{k}_0, \bar{l}_0), (\bar{k}_0+4, \bar{l}_0), (\bar{k}_0+8, \bar{l}_0)$ | 0,0,0 | 0,1 | 0,1 |
| 23 | 8 | 3 | cdm8-FD2-TD2 | $(\bar{k}_0, \bar{l}_0), (\bar{k}_0+4, \bar{l}_0), (\bar{k}_0+8, \bar{l}_0)$ | 0,0,0 | 0,1 | 0,1 |
| 24 | 12 | 3 | cdm4-FD2-TD2 | $(\bar{k}_0, \bar{l}_0), (\bar{k}_0+4, \bar{l}_0), (\bar{k}_0+8, \bar{l}_0)$ $(\bar{k}_0, \bar{l}_1), (\bar{k}_0+4, \bar{l}_1), (\bar{k}_0+8, \bar{l}_1)$ $(\bar{k}_0, \bar{l}_2), (\bar{k}_0+4, \bar{l}_2), (\bar{k}_0+8, \bar{l}_2)$ | 0,0,0,1,1,1, 2,2,2 | 0,1 | 0,1 |
| 25 | 16 | 3 | cdm4-FD2-TD2 | $(\bar{k}_0, \bar{l}_0), (\bar{k}_0+4, \bar{l}_0), (\bar{k}_0+8, \bar{l}_0)$ $(\bar{k}_0, \bar{l}_1), (\bar{k}_0+4, \bar{l}_1), (\bar{k}_0+8, \bar{l}_1)$ $(\bar{k}_0, \bar{l}_2), (\bar{k}_0+4, \bar{l}_2), (\bar{k}_0+8, \bar{l}_2)$ $(\bar{k}_0, \bar{l}_3), (\bar{k}_0+4, \bar{l}_3), (\bar{k}_0+8, \bar{l}_3)$ | 0,0,0,1,1,1, 2,2,2,3,3,3 | 0,1 | 0,1,2,3 |
| 26 | 16 | 3 | cdm8-FD2-TD4 | $(\bar{k}_0, \bar{l}_0), (\bar{k}_0+4, \bar{l}_0), (\bar{k}_0+8, \bar{l}_0)$ | 0,0,0,1,1,1 | 0,1 | 0,1,2,3 |
| 27 | 24 | 3 | cdm8-FD2-TD2 | $(\bar{k}_0, \bar{l}_0), (\bar{k}_0+4, \bar{l}_0), (\bar{k}_0+8, \bar{l}_0)$ $(\bar{k}_0, \bar{l}_1), (\bar{k}_0+4, \bar{l}_1), (\bar{k}_0+8, \bar{l}_1)$ $(\bar{k}_0, \bar{l}_2), (\bar{k}_0+4, \bar{l}_2), (\bar{k}_0+8, \bar{l}_2)$ | 0,0,0,1,1,1, 2,2,2 | 0,1 | 0,1,2,3 |
| 28 | 32 | 3 | cdm8-FD2-TD4 | $(\bar{k}_0, \bar{l}_0), (\bar{k}_0+4, \bar{l}_0), (\bar{k}_0+8, \bar{l}_0)$ $(\bar{k}_0, \bar{l}_1), (\bar{k}_0+4, \bar{l}_1), (\bar{k}_0+8, \bar{l}_1)$ $(\bar{k}_0, \bar{l}_2), (\bar{k}_0+4, \bar{l}_2), (\bar{k}_0+8, \bar{l}_2)$ $(\bar{k}_0, \bar{l}_3), (\bar{k}_0+4, \bar{l}_3), (\bar{k}_0+8, \bar{l}_3)$ | 0,0,0,1,1,1, 2,2,2,3,3,3 | 0,1 | 0,1,2,3 |

WIRELESS COMMUNICATION DEVICE FOR TRANSMITTING AND RECEIVING REFERENCE SIGNALS AND OPERATING METHOD THEREOF

CROSS-REFERENCE TO RELATED APPLICATIONS

This application is based on and claims priority under 35 U.S.C. § 119 to Korean Patent Application Nos. 10-2021-0118961 filed on Sep. 7, 2021, and 10-2022-0077084 filed on Jun. 23, 2022, in the Korean Intellectual Property Office, the disclosures of which are incorporated by reference herein in their entireties.

BACKGROUND

The inventive concepts relate to a wireless communication device for transmitting and receiving reference signals.

Base stations may transmit reference signals to a user equipment (UE) to determine channel information regarding a channel between the base stations and the UE. For example, a base station may transmit a channel state information-reference signal (CSI-RS) to determine the channel information regarding a channel between the base station and a UE. The UE may determine a channel between the base station and the UE based on the CSI-RS received from the base station. The UE may report feedback information about the determined channel to the base station.

SUMMARY

The inventive concepts provide a wireless communication device for transmitting and receiving reference signals and an operating method thereof. Embodiments enable a UE to determine a channel more accurately and to report more accurate feedback information to a base station.

According to an aspect of the inventive concepts, there is provided an operating method of a user equipment (UE), the operating method including receiving channel state information-reference signal (CSI-RS) configuration information from a base station, the CSI-RS configuration information including time and frequency location information of a first CSI-RS, and the first CSI-RS corresponding to a first density value of 0.5, 1 or 3, determining whether to request a second CSI-RS having a second density value based on a channel characteristic, the second density value being different from the first density value, and the channel characteristic corresponding to a channel between the UE and the base station, transmitting a CSI-RS density change request message to the base station in response to determining to request the second CSI-RS, receiving the second CSI-RS from the base station based on the CSI-RS configuration information, the second CSI-RS being based on the CSI-RS density change request message, estimating the channel based on the second CSI-RS to obtain a channel estimate, and transmitting a CSI-RS report to the base station, the CSI-RS report being based on the channel estimate.

According to an aspect of the inventive concepts, there is provided an operating method of a user equipment (UE), the operating method including determining whether to request a first tracking reference signal (TRS) having a first frequency length based on a channel characteristic, the channel characteristic corresponding to a channel between the UE and a base station, transmitting a frequency length change request message to the base station in response to determining to request the first TRS, receiving the first TRS having from the base station, the first TRS having the first frequency length, and the first frequency length being different from a previous frequency length of a previously received TRS, and performing time and frequency tracking based on the first TRS.

According to an aspect of the inventive concepts, there is provided a user equipment (UE) including processing circuitry configured to receive channel state information-reference signal (CSI-RS) configuration information from a base station, the CSI-RS configuration information including time and frequency location information of a first CSI-RS, and the first CSI-RS corresponding to a first density value of 0.5, 1 or 3, determine whether to request a second CSI-RS having a second density value based on a channel characteristic, the second density value being different from the first density value, and the channel characteristic corresponding to a channel between the UE and the base station, transmit a CSI-RS density change request message to the base station in response to determining to request the second CSI-RS, receive the second CSI-RS from the base station based on the CSI-RS configuration information, the second CSI-RS being based on the CSI-RS density change request message, estimate the channel based on the second CSI-RS to obtain a channel estimate, and transmit a CSI-RS report to the base station, the CSI-RS report being based on the channel estimate.

BRIEF DESCRIPTION OF THE DRAWINGS

Embodiments will be more clearly understood from the following detailed description taken in conjunction with the accompanying drawings in which:

FIGS. 7A and 7B illustrate location information of a CSI-RS according to embodiments;

DETAILED DESCRIPTION

Figure 1:
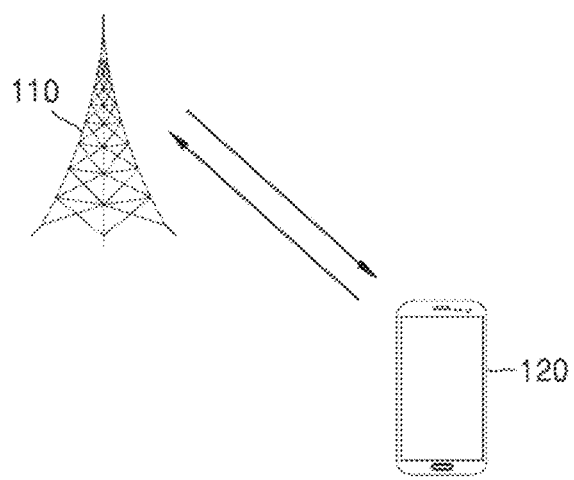
FIG. 1 illustrates a wireless communication system according to embodiments.

A base station may be an entity which communicates with a wireless communication device and allocates a communication network resource to the wireless communication device. The base station may be at least one of a cell, a base station (BS), a NodeB (NB), an eNodeB (eNB), a next generation radio access network (NG RAN), a wireless access unit, a base station controller, a node of a network, a gNodeB (gNB), a transmission and reception point, (TRP), a remote radio head (RRH), etc.

A wireless communication device may be an entity which communicates with a base station or another wireless communication device. The wireless communication device may be referred to as a node, a user equipment (UE), a next generation UE (NG UE), a mobile station (MS), a mobile equipment (ME), a device, a terminal, etc.

Moreover, a wireless communication device may include at least one of a smartphone, a tablet personal computer (PC), a mobile phone, a video phone, an e-book reader, a desktop PC, a laptop PC, a netbook computer, a personal digital assistant (PDA), an MP3 player, a medical device, a camera, a wearable device, etc. Moreover, a wireless communication device may include at least one of a television (TV), a digital video disk (DVD) player, an audio player, a refrigerator, an air conditioner, a vacuum cleaner, an oven, a microwave oven, a washer, a dryer, an air purifier, a set-top box, a home automation control panel, a security control panel, a media box (for example, Samsung HomeSync™, Apple TV™, or Google TV™), a gaming console (for example, Xbox™ or PlayStation™), an electronic dictionary, an electronic key, a camcorder, an electronic picture frame, etc. Moreover, a wireless communication device may include at least one of various medical devices (for example, various portable medical measurement devices (for example, a blood sugar measurer, a heartbeat measurer, a blood pressure measurer, a body temperature measurer, etc.), a magnetic resonance angiography (MRA) device, a magnetic resonance imaging (MRI) device, a computed tomography (CT) device, an imaging device, an ultrasonic device, etc.), a navigation device, a global navigation satellite system (GNSS) receiver, an event data recorder (EDR), a flight data recorder (FDR), an automotive infotainment device, a naval electronic device (for example, a naval navigation device, a gyro compass, etc.), an avionic electronic device, a security device, an automotive head unit, an industrial or consumer robot, a drone, an automated teller machine (ATM), a point of sales (POS) device, an Internet of things (IoT) device (for example, a light bulb, various sensors, a spring cooler device, a fire alarm, a temperature controller, a street lamp post, a toaster, sporting equipment, a hot water tank, a heater, a boiler, etc.), etc. In addition, a wireless communication device may include various kinds of multimedia systems for performing a communication function.

Hereinafter, embodiments will be described in detail with reference to the accompanying drawings.

FIG. 1 illustrates a wireless communication system according to embodiments.

Referring to FIG. 1, the wireless communication system may include a wireless communication device 120 and/or a base station 110. Hereinafter, the wireless communication device 120 may be referred to as the UE 120. For convenience of descriptions, the wireless communication system is illustrated as including only one base station 110 and one UE 120, but this is merely an example and embodiments are not limited thereto. In embodiments, the wireless communication system may be implemented to include a varying number of base stations and UEs.

The base station 110 may be connected to the UE 120 through a wireless channel and may provide various communication services. The base station 110 may provide a service through a shared channel for all user traffic and may collect pieces of state information such as a buffer state, an available transmission power state, and/or a channel state of the UE 120. The base station 110 may perform scheduling based on the state information. The wireless communication system may support beamforming technology by using orthogonal frequency division multiplexing (OFDM) as wireless access technology (e.g., an encoding scheme). Also, the wireless communication system may support an adaptive modulation & coding (AMC) scheme which determines a modulation scheme and a channel coding rate, based on a channel state of the UE 120.

Also, the wireless communication system may transmit and receive a signal by using a wide frequency band which is in a frequency band of 6 GHz or more. For example, the wireless communication system may increase a data transmission rate by using a millimeter wave band like 28 GHz band or 60 GHz band. In this case, because a signal in the millimeter wave band has a higher attenuation magnitude with respect to distance, the wireless communication system may support transmission and reception based on a directional beam generated by using multiple antennas, so as to improve the security (e.g., reliability) of coverage. The wireless communication system may be a system which supports multiple input multiple output (MIMO), and thus, the base station 110 and the UE 120 may support beamforming technology. The beamforming technology may be divided into digital beamforming, analog beamforming, and hybrid beamforming. Hereinafter, embodiments where the wireless communication system supports the hybrid beamforming technology will be mainly described, but it may be sufficiently understood that the inventive concepts may be applied to other beamforming technology.

Referring to FIG. 1, the base station 110 may transmit configuration information about a channel state information-reference signal (CSI-RS) to the UE 120. The configuration information about the CSI-RS may include location information in a time domain and a frequency domain of a CSI-RS based on one of densities 0.5, 1, and/or 3. For example, the configuration information about the CSI-RS may include location information in a time domain and a frequency domain of a CSI-RS which has density 3 (e.g., a density value of 3) and is based on a plurality of antenna ports. A CSI-RS based on the plurality of antenna ports may be referred to as a multi-port CSI-RS.

The UE 120 may identify a density (e.g., a density value) of a CSI-RS and may transmit a CSI-RS density change request message to the base station 110. In detail, the UE 120 may request a CSI-RS (e.g., a second CSI-RS), having a density (e.g., a second density value) which differs from the identified density (e.g., a first density value) of the CSI-RS (e.g., a first CSI-RS), from the base station 110.

For example, the UE 120 may identify that a density of a received CSI-RS is 0.5. In detail, the UE 120 may estimate a channel between the base station 110 and the UE 120 by using a CSI-RS. The UE 120 may determine whether a density of a CSI-RS increases (e.g., should be increased), based on an estimated channel characteristic (e.g., corresponding to the channel between the base station 110 and the UE 120). The UE 120 may identify a density of a received CSI-RS and may issue a request, to the base station 110, to more increase the density of the CSI-RS than the identified density (e.g., to provide a CSI-RS at a density higher than that previously receive by the UE 120) based on the determination. The UE 120 may request a CSI-RS, having density 3 which is higher than density 0.5, from the base station 110. A CSI-RS request message may be transmitted through higher layer signaling. Also, the UE 120 may request a tracking reference signal (TRS) having a bandwidth part (BWP) length from the base station 110.

Figure 2:
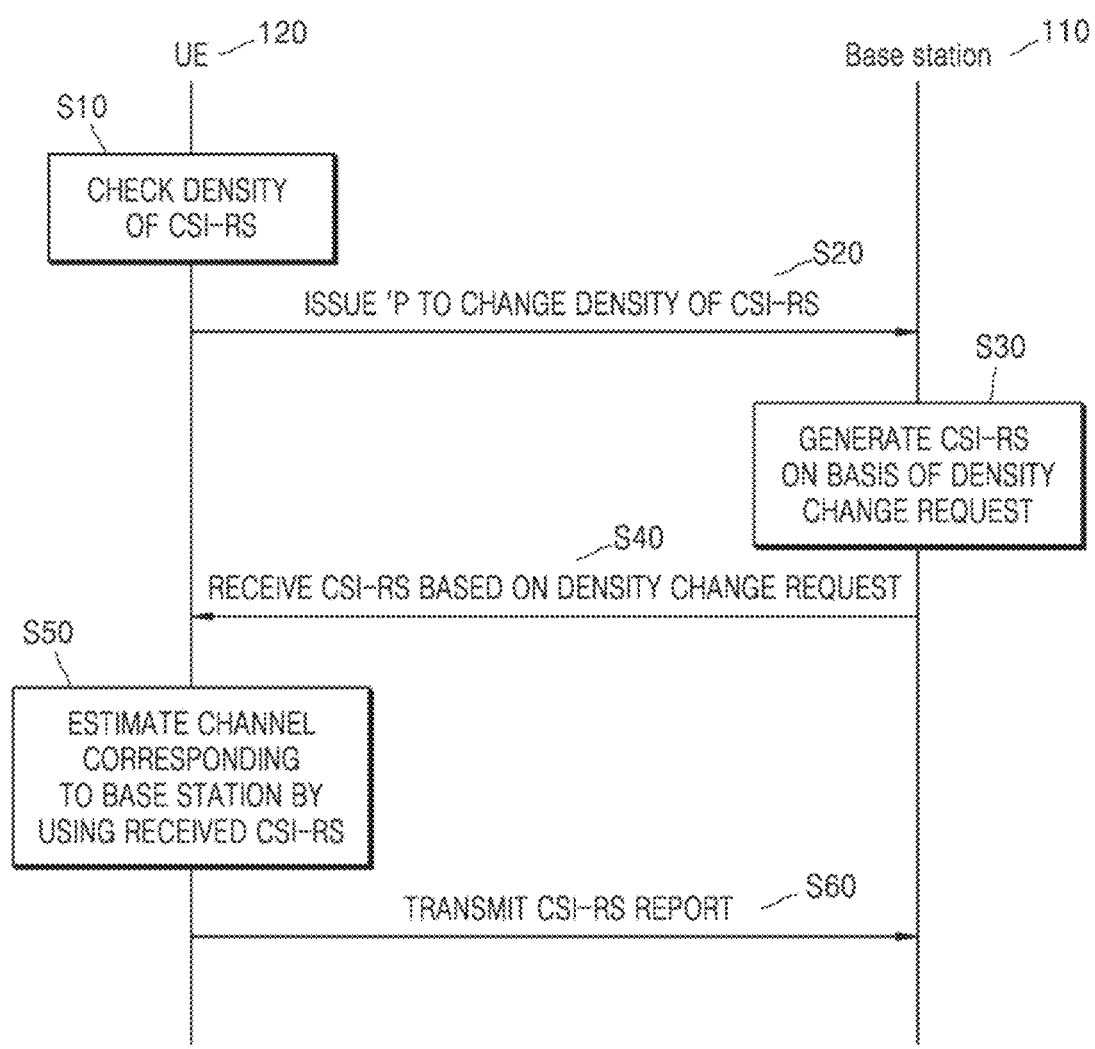
FIG. 2 is a flowchart illustrating an operating method of a base station and a user equipment (UE) for estimating a channel according to a selectively requested CSI-RS density, according to embodiments.

FIG. 2 is a flowchart illustrating an operating method of a base station and a user equipment (UE) for estimating a channel according to a selectively requested CSI-RS density, according to embodiments.

The UE 120 may receive a CSI-RS (not shown) from a base station 110. The UE 120 may receive the CSI-RS from the base station 110 based on (e.g., according to a timing corresponding to) one of a periodic, aperiodic, and/or semi-persistent scheme. Referring to FIG. 2, in operation S10, the UE 120 may identify a density (e.g., the first density value) of the received CSI-RS (e.g., the first CSI-RS). For example, the UE 120 may identify that a density of the received CSI-RS is at least one of 0.5, 1, and/or 3. A density of the CSI-RS may denote the number of subcarriers of each resource block occupied by the CSI-RS. A density may be one of 0.5, 1, and/or 3. The UE 120 may estimate a channel of the base station 110 and the UE 120 by using the CSI-RS. The UE 120 may determine whether a density of the CSI-RS increases (e.g., whether a second density value of a second CSI-RS should be increased with respect to the first density value), based on an estimated channel characteristic. The UE 120 may identify a density of the received CSI-RS and may issue a request, to the base station 110, to more increase the density of the CSI-RS with respect to the identified density based on the determination.

In operation S20, the UE 120 may transmit a CSI-RS density change request message to the base station 110. The UE 120 may request a CSI-RS (e.g., the second CSI-RS) having a certain density (e.g., the second density value) from the base station 110 through higher layer signaling. For example, the UE 120 may request a CSI-RS having a certain density from the base station 110 through radio resource control (RRC) signaling. The transmission of the CSI-RS density change request message to the base station 110 will be described in further detail with reference to FIGS. 4A and 4B.

In operation S30, the base station 110 may generate a CSI-RS based on a density change request of the UE 120. For example, the base station 110 may generate a CSI-RS having a density 3 based on a request of the UE 120 and may transmit the generated CSI-RS to the UE 120. In operation S40, the UE 120 may receive the CSI-RS based on the density change request. For example, the UE 120 may receive the CSI-RS having a density 3.

In operation S50, the UE 120 may estimate a channel between the UE 120 and the base station 110 by using the received CSI-RS. For example, the UE 120 may identify a channel between the UE 120 and the base station 110 by using the received CSI-RS having a density 3 and may transmit a CSI-RS report to the base station 110. The CSI-RS report may be referred to as CSI-RS feedback or a CSI-RS feedback report. The UE 120 may more accurately estimate a channel by using a CSI-RS having a changed density, and thus, may transmit a more accurate CSI-RS report.

In operation S60, the UE 120 may transmit a CSI-RS report to the base station 110. CSI-RS report information may include at least one of channel quality information (CQI), a precoding matrix indicator (PMI), a CSI-RS resource indicator (CRI), a synchronization signal/physical broadcast channel resource block indicator (SSBRI), a layer indicator (LI), a rank indicator (RI), a layer1-reference signal received power (L1-RSRP), and/or a layer1-signal to interference plus noise ratio (L1-SINR).

Figure 3:
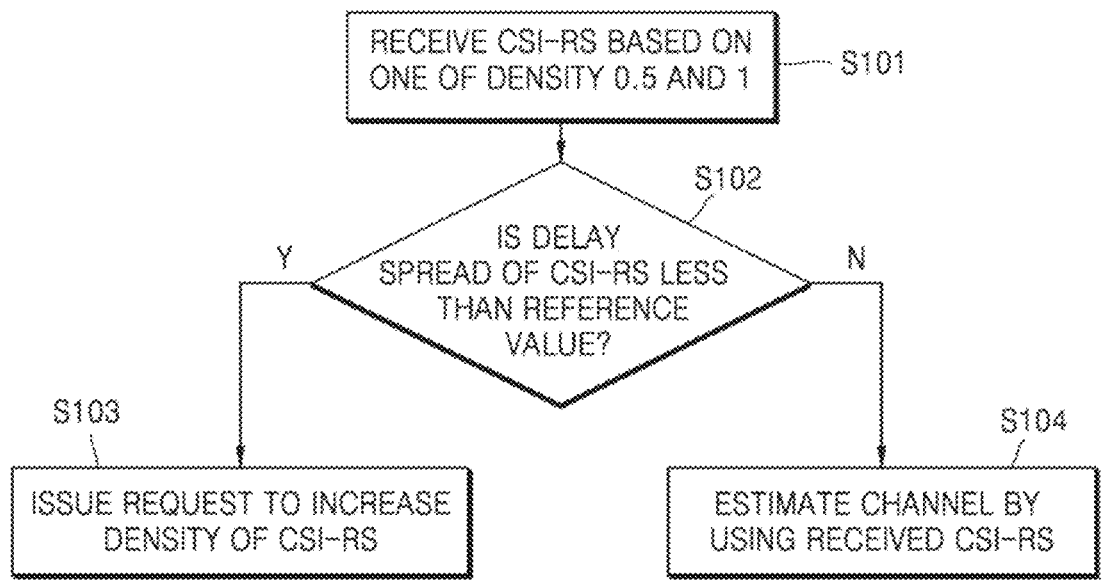
FIG. 3 illustrates an operating process of a UE for estimating a channel according to a selectively requested CSI-RS density according to embodiments.

FIG. 3 illustrates an operating process of a UE for estimating a channel according to a selectively requested CSI-RS density according to embodiments.

The UE 120 may estimate a channel between the base station 110 and the UE 120 by using a received CSI-RS. The UE 120 may issue a request to change a density of a CSI-RS by using a characteristic of the estimated channel between the base station 110 and the UE 120. For example, the UE 120 may issue a request to change a density of a CSI-RS based on a resolution of the CSI-RS. Hereinafter, the operating method of the UE will be described in detail.

In operation S101, the UE 120 may receive a CSI-RS based on one of density 0.5 and/or 1 from a base station (e.g., the base station 110 of FIG. 1). According to embodiments, the CSI-RS may be received based on a multi-path.

In operation S102, the UE 120 may identify whether a delay spread of the CSI-RS (e.g. the first CSI-RS) is less than a reference value.

In detail, the UE 120 may calculate a resolution of the CSI-RS (e.g., the first CSI-RS). For example, the UE 120 may calculate the resolution of the CSI-RS based on Equation 2 described below. Resolution may be referred to as a ratio of a channel path of a CSI-RS capable of being observed from a path of a system bandwidth in a channel impulse response (CIR) domain by using the UE 120.

Also, the UE 120 may determine whether the delay spread of the CSI-RS is less than the reference value, based on the calculated resolution of the CSI-RS. For example, the UE 120 may determine whether a delay spread value of the CSI-RS is less than $$\text{Relay delay Spread} \propto$$

value. The delay spread value of the CSI-RS may be expressed as $$\frac{N_{IFFT}^{CSIRS}}{\text{Resolution}}.$$

$N_{IFFT}^{CSIRS}$ may be referred to as an inverse fast Fourier transform (IFFT) size when a CSI-RS is transformed into a time domain. Resolution may be resolution and will be described below with reference to Equation 2. Real delay Spread may be delay spread measured based on the CSI-RS and a reference signal on which quasi-location (QCL) has been performed. Here, the reference signal may be one of a tracking reference signal (TRS) and/or a synchronization signal block (SSB). α may be a number which is more than 0 and less than 1.

In operation S103, when the delay spread value is less than the $$\text{Relay delay Spread} \propto$$

value (Y in operation S102), the UE 120 may issue a request, to the base station 110, to increase a density of the CSI-RS. For example, when a CSI-RS having density 0.5 is received, the UE 120 may request a CSI-RS having one of density 1 and/or density 3. As another example, when a CSI-RS having density 1 is received, the UE 120 may request a CSI-RS having density 3.

In operation S104, when the delay spread value of the CSI-RS is greater than or equal to the $$\frac{\text{Relay delay Spread}}{\alpha}$$

value (N in operation S102), the UE 120 may estimate a channel by using the received CSI-RS based on one of density 0.5 and/or 1.

Figure 4A:
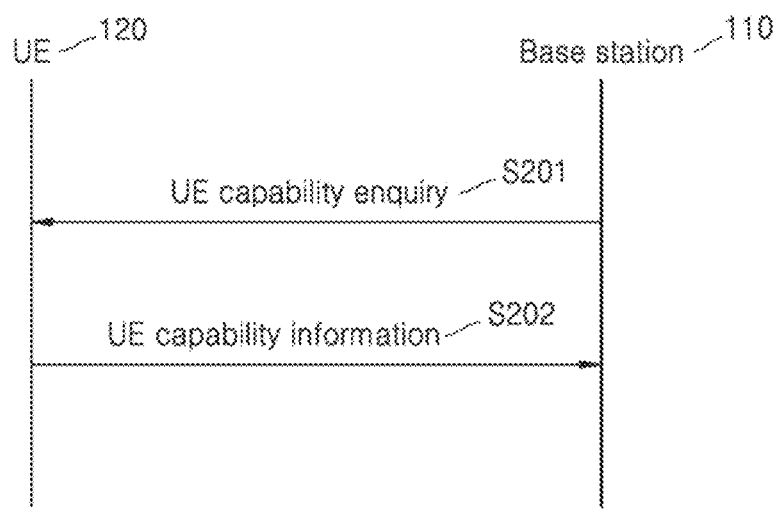
FIGS. 4A and 4B illustrate an operating process in which a UE transmits a channel state information-reference signal (CSI-RS) request message, according to embodiments.
Figure 4B:
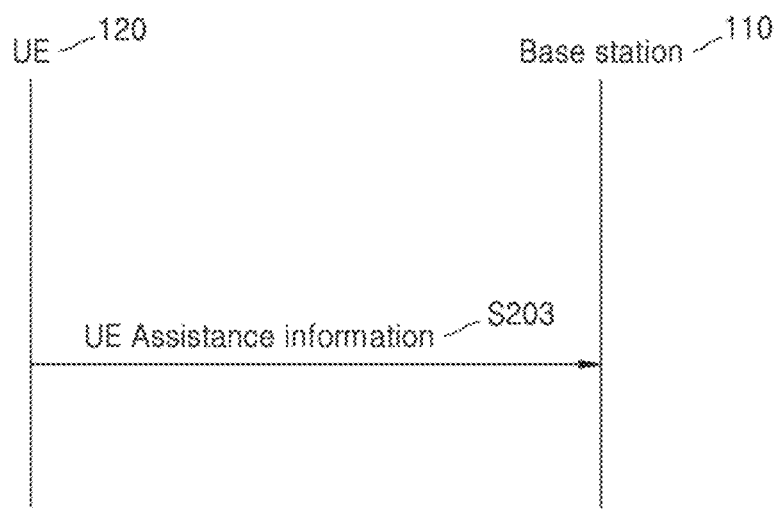

FIGS. 4A and 4B illustrate an operating process in which a UE transmits a channel state information-reference signal (CSI-RS) request message, according to embodiments.

Referring to FIG. 4A, in operation S201, the UE 120 may receive a UE capability request message from the base station 110. The base station 110 may issue a request, to the UE 120, to transmit capability information about the UE 120 by using the UE capability request message.

In operation S202, the UE 120 may transmit UE capability information (e.g., a UE capability information message) to the base station 110. That is, the UE 120 may transmit the UE capability information to the base station 110 through RRC signaling. The UE capability information may include pieces of capability information supported by the UE 120. The UE capability information may include a CSI-RS request message corresponding to a certain density. The CSI-RS request message corresponding to the certain density may be referred to as a CSI-RS density change request message, but is not limited to the example described above. For example, the UE capability information may include a CSI-RS request message corresponding to one of density 0.5, 1, and/or 3. The CSI-RS request message corresponding to the certain density may be included in a parameter associated with the UE capability information. For example, the CSI-RS request message corresponding to the certain density may be included in an MIMO-ParametersPerBand information element. The MIMO-ParametersPerBand may be relevant to MIMO and may be used to transfer parameters corresponding to a certain band.

The base station 110 may receive the CSI-RS request message corresponding to the certain density and may allocate a CSI-RS having a certain density to the UE 120 by using (e.g., based on) the received CSI-RS request message. For example, the UE 120 may transmit the UE capability information, including a CSI-RS request message based on density 3, to the base station 110, and the base station 110 may receive the UE capability information and may allocate a CSI-RS based on density 3 to the UE 120.

Referring to FIG. 4B, in operation S203, the UE (e.g., the UE 120 of FIG. 1) may transmit a UE assistance information message to the base station 110 through RRC signaling. The UE assistance information message may include a CSI-RS request message based on a certain density. That is, the CSI-RS request message based on a certain density may be included in the UE assistance information message.

The base station 110 may receive the CSI-RS request message corresponding to the certain density and may allocate a CSI-RS having a certain density to the UE 120 by using (e.g., based on) the received CSI-RS request message. For example, the UE 120 may transmit the UE assistance information message, including a CSI-RS request message based on density 3, to the base station 110, and the base station 110 may receive the UE capability information and may allocate the CSI-RS based on density 3 to the UE 120.

Signaling associated with a CSI-RS request based on a certain density according to embodiments may be included in all signaling transmitted and received between a UE and a base station, but is not limited to the example described above.

Figure 5:
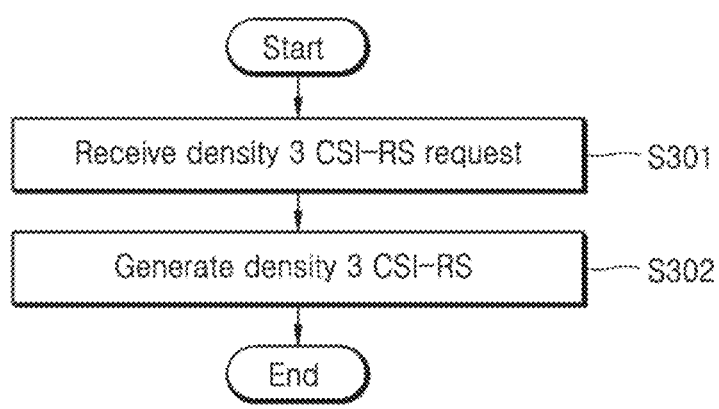
FIG. 5 illustrates an operating process of a base station for generating a CSI-RS having a requested density according to embodiments.

FIG. 5 illustrates an operating process of a base station for generating a CSI-RS having a requested density according to embodiments.

A base station (e.g., the base station 110 of FIG. 1) may receive a CSI-RS request message based on a certain density from a UE (e.g., the UE 120 of FIG. 1). Referring to FIG. 5, in operation S301, the base station 110 may receive a CSI-RS request message. For example, when delay spread of a CSI-RS is less than a reference value, the UE 120 may transmit a CSI-RS request message based on density 3 to the base station 110, and the base station 110 may receive the CSI-RS request message.

In operation S302, the base station 110 may generate a CSI-RS based on density 3, in response to the CSI-RS request message. For example, the base station 110 may generate a single-port CSI-RS based on density 3. As another example, the base station 110 may generate a multi-port CSI-RS based on density 3. The base station 110 may allocate the generated CSI-RS based on density 3 to the UE 120. Also, the base station 110 may transmit the multi-port CSI-RS based on density 3 to the UE 120.

Figure 6:
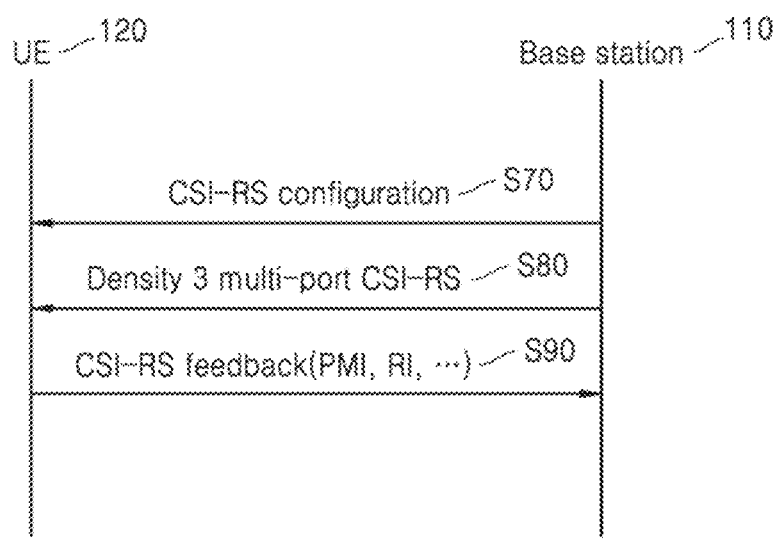
FIG. 6 illustrates an operating process of a base station and a UE for estimating a channel according to a multi-port CSI-RS based on density 3, according to embodiments.

FIG. 6 illustrates an operating process of a base station and a UE for estimating a channel according to a multi-port CSI-RS based on density 3, according to embodiments.

Referring to FIG. 6, in operation S70, a UE 120 may receive CSI-RS configuration information from a base station 110 (e.g., corresponding to a first CSI-RS). The CSI-RS configuration information may be transmitted and received through higher layer signaling. For example, the CSI-RS configuration information may transmitted and received through RRC signaling. The CSI-RS configuration information may include CSI-RS location information in a time domain and a frequency domain of a CSI-RS. For example, the CSI-RS configuration information may include resource allocation information about a multi-port CSI-RS based on density 3.

In operation S80, the base station 110 may transmit a CSI-RS (e.g., a second CSI-RS) to the UE 120. For example, the base station 110 may allocate the multi-port CSI-RS based on density 3 to the UE 120 based on UE capability information received from the UE 120 and may transmit the multi-port CSI-RS based on density 3 to the UE 120. As another example, the base station 110 may transmit the multi-port CSI-RS based on density 3 to the UE 120 based on the number of physical antennas of the base station 110. The UE 120 may receive the CSI-RS (e.g., the second CSI-RS) from the base station 110 based on the received CSI-RS configuration information (e.g., the configuration information corresponding to the first CSI-RS).

In operation S90, the UE 120 may transmit a CSI-RS report to the base station 110. According to embodiments, the UE 120 may generate the CSI-RS report based on a channel estimation performed by the UE 120 on the channel between the UE 120 and the base station 110, the channel estimation being performed based on the second CSI-RS. The CSI-RS report may include at least one of a PMI, an RI, and/or a CQI. The PMI may include precoding matrix information suitable for a channel estimated through the CSI-RS (e.g., the second CSI-RS). For example, the PMI may include precoding matrix information suitable for a channel estimated through the multi-port CSI-RS based on density 3. The RI may include rank information suitable for the channel estimated through the CSI-RS (e.g., the second CSI-RS). For example, the RI may include rank information suitable for the channel estimated through the multi-port CSI-RS based on density 3.

FIGS. 7A and 7B illustrate location information about CSI-RS according to embodiments.

Referring to FIGS. 7A and 7B, a CSI-RS according to embodiments may be supported up to 1, 2, 3, 8, 12, 16, 24, and/or 32 ports. Referring to FIG. 7A, a CSI-RS based on density 3 may be transmitted and received through a single port. A single port may denote one antenna port. Referring to FIG. 7B, a CSI-RS based on density 3 may be transmitted and received based on a multiport. A multiport may denote a plurality of antenna ports. For example, the number of CSI-RS ports may be 2, 4, 8, 12, 16, 24, and/or 32.

CSI-RS location information in FIGS. 7A and 7B may be transmitted to the UE 120 by the base station 110 through higher layer signaling. For example, the base station 110 may transmit multi-port CSI-RS location information based on density 3 to the UE 120 through RRC signaling.

The base station 110 may transfer a location in a time domain of a CSI-RS through an RRC parameter. For example, the base station may transmit locations $l_0 \in \{0, 1, \ldots, 13\}$ and $l_1 \in \{2, 3, \ldots, 12\}$ added to firstOFDM-SymbolInTimeDomain and firstOFDMSymbolInTimeDomain2 parameters, in the time domain.

The base station 110 may transfer bitmap information associated with a location in the frequency domain of the CSI-RS through an RRC parameter. For example, the base station 110 may transfer a location in the frequency domain in the form of a $k_i$ value and a bitmap based on CSI-RS-ResourceConfigMobility or a frequencyDomainAllocation parameter of a CSI-RS-ResourceMapping information element (IE). Also, the base station 110 may allocate 2 to a bit string size of a multi-port CSI-RS based on density 3 and may transmit such information through the frequencyDomainAllocation parameter.

The bitmap and the $k_i$ value may be expressed as in the following Table 1. In Table 1, f(i) may denote an ith bit number which is set to 1 in the bitmap.

TABLE 1

| Row of FIG. 7A and FIG. 7B | Bitmap and $k_i$ |
| --- | --- |
| 1 | $[b_3 \ldots b_0]$, $k_{i-1} = f(i)$ |
| 2 | $[b_{11} \ldots b_0]$, $k_{i-1} = f(i)$ |
| 4 | $[b_2 \ldots b_0]$, $k_{i-1} = 4f(i)$ |
| Multi-port CSI-RS with density 3 | $[b_0 \wedge b_1]$, $k_{i-1} = 2f(i)$ |
| All other cases | $[b_5 \ldots b_0]$, $k_{i-1} = 2f(i)$ |

Figure 8:
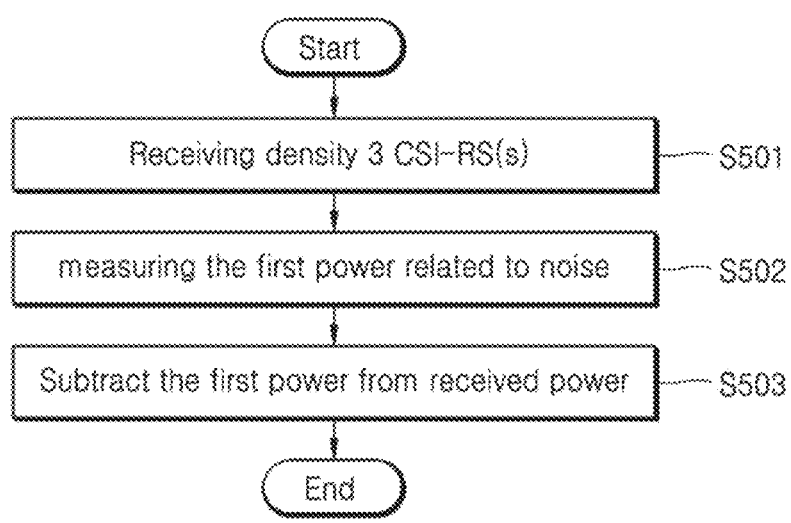
FIG. 8 illustrates an operating process of a UE for estimating an RSRP of a CSI-RS according to embodiments.

FIG. 8 illustrates an operating process of a UE for estimating an RSRP of a CSI-RS according to embodiments.

A UE (e.g., the UE 120 of FIG. 1) may measure a received signal received power (RSRP) of a CSI-RS. Hereinafter, an example of a process of measuring the RSRP by using the UE 120 will be described.

In operation S501, the UE 120 may receive a multi-port CSI-RS (e.g., the second CSI-RS) based on density 3 (e.g., the second density value) from a base station (e.g., the base station 110 of FIG. 1).

In operation S502, the UE 120 may measure first power related to noise (e.g., a first power related to noise in a time domain with respect to the second CSI-RS). For example, the UE 120 may measure the first power in a noise invariance (NIV) period. In detail, the UE 120 may measure power of a period where it is expected that a channel path of a CSI-RS is not in a OR domain. According to embodiments, the UE 120 may measure a received power of the CSI-RS (e.g., the second CSI-RS).

In operation S503, the UE 120 may exclude the first power in a received power of the CSI-RS (e.g., subtract the first power from the received power of the CSI-RS), and thus, may measure a RSRP of a multi-port CSI-RS (e.g., the second CSI-RS) based on density 3. As described above, the UE 120 may measure a signal to interference & noise ratio (SINR), but is not limited to the example described above.

The UE 120 may accurately measure a signal power (e.g., the RSRP of the second CSI-RS) of the CSI-RS by using the multi-port CSI-RS based on density 3. RSRP measurement in the time domain described above may be expressed as the following Equation 1.

$$E[|h|^2] = \frac{\sum_{k=0}^{K-1} |x[k]^* y[k]|^2}{K} - \hat{\sigma}^2 \quad \text{[Equation 1]}$$

$$\hat{\sigma}^2 = \frac{\sum_{n=N_{Window}^{Start}}^{N_{Window}^{End}-1} |\hat{h}^{CSIRS}[n]|^2}{N_{Window}^{End} - N_{Window}^{Start}}$$

In Equation 1, x[k] may denote a CSI-RS sequence in a kth subcarrier. y[k] may denote a received signal in the kth subcarrier. $\hat{\sigma}^2$ may denote an estimated NIV. $\sigma^2$ may denote an NIV. $\hat{h}^{CSIRS}[N]$ may denote a CSI-RS channel in a time domain after descrambling. $N_{Window}^{End}$ may denote an end of a noise window for NIV measurement $N_{Window}^{Start}$ may denote a start of the noise window for NIV measurement.

In a CSI-RS based on density 3, an interval between reference signals may be relatively less (e.g., shorter) than a CSI-RS based on density 0.5 and/or 1. Therefore, a delay spread value of the CSI-RS based on density 3 may be greater than a delay spread value of the CSI-RS based on density 0.5 and/or a delay spread value of the CSI-RS based on density 1.

For example, a resolution of the delay spread value of the CSI-RS based on density 3 may be less than that of the delay spread value of the CSI-RS based on density 1. As another example, $N_{IFFT}^{CSIRS}$ of the delay spread value of the CSI-RS based on density 3 may be greater than $N_{IFFT}^{CSIRS}$ of the delay spread value of the CSI-RS based on density 1.

A resolution of the CSI-RS may vary based on an RCC configuration of the CSI-RS. The UE 120 may calculate a resolution of a channel path shown in a OR domain of the CSI-RS. Resolution may be expressed as in the following Equation 2.

$$\text{Resolution } (\gamma) = \frac{\gamma^{dis} N_{IFFT}^{CSIRS}}{N_{FFT}^{BW}} \quad \text{[Equation 2]}$$

$\gamma^{dis}$ may denote an interval in a frequency domain between CSI-RSs. $N_{IFFT}^{CSIRS}$ may denote an IFFT size of the CSI-RS. In a case where the UE 120 transforms the CSI-RS into a time domain through an IFFT, the IFFT size of the CSI-RS may be obtained. $N_{FFT}^{BW}$ may denote a fast Fourier transform (FFT) size of a system bandwidth (BW). For example, in a case where a system bandwidth is 100 MHz, subcarrier spacing (SCS) is 30 kHz, a length (e.g., a frequency length) of a bandwidth part (BWP) is 273 resource blocks (RBs), and a CSI-RS based on density 1 is transmitted at a wideband, resolution may be calculated as in the following Equation 3.

$$\gamma = 12 * \frac{512}{4096} = 1.5 \quad \text{[Equation 3]}$$

Tapped delay line (TDL)-A may denote a channel where maximum (or highest) delay spread is 290 ns. In a TDL-A channel, a last path may be located at a 35th tap in a CIR domain of a system bandwidth. A tap may denote an orthogonal frequency division multiplexing (OFDM) sample. As described above, because resolution is 1.5, a last path may be shown like being located at a 35th tap in a CIR domain of a CSI-RS. This may be a point which is located at about 10% of IFFT size 512 of the CSI-RS.

TDL-C may denote a channel where maximum (or highest) delay spread is 2,595 ns. In a TDL-C channel, a last path may be located at a 318th tap in a CIR domain of a system bandwidth. As described above, because resolution is 1.5, a last path may be shown like being located at a 477th tap in a CIR domain of a CSI-RS. This may be a point which is located at about 93% of IFFT size 512 of the CSI-RS. In this case, it may be considered that a valid channel path is in a total CIR. Therefore, it may be difficult for the UE 120 to conservatively set an NIV measurement period.

The UE 120 may determine to increase a density of a CSI-RS, and thus, may lower resolution. Also, the UE 120 may request a CSI-RS based on the determined density from the base station 110, and thus, the UE 120 may accurately measure signal power of the CSI-RS.

For example, in a case where a system bandwidth is 100 MHz, an SCS is 30 kHz, a BWP is 273 RB, and a CSI-RS based on density 3 is transmitted at a wideband, resolution may be expressed as in the following Equation 4.

$$\gamma = 4 * \frac{1024}{4096} = 1 \quad \text{[Equation 4]}$$

As described above, because resolution is 1, a last path may be shown like being located at a 318th tap in the TDL-C channel. This may be a point which is located at about 32% of IFFT size 1,024 of the CSI-RS. Therefore, it may be difficult for the UE 120 to conservatively set an NIV measurement period. Accordingly, in a channel where maximum (or highest) delay spread is long, the UE 120 may measure accurate signal power and may provide feedback including at least one of accurate L1-RSRP, L1-SINR, CQI, PMI, and/or RI.

Figure 9:
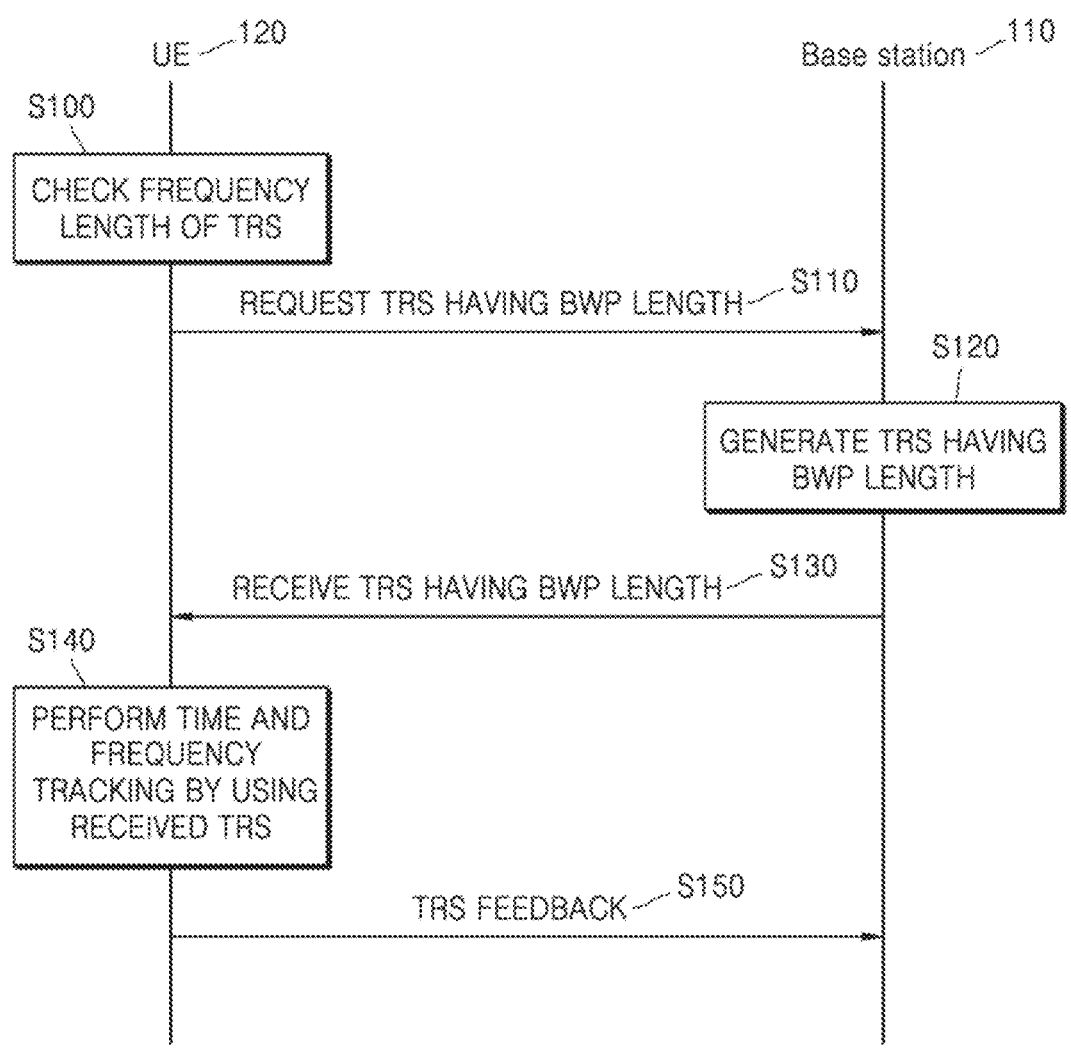
FIG. 9 illustrates an operating process of a base station and a UE for estimating a channel according to a selectively requested TRS length, according to embodiments.

FIG. 9 illustrates an operating process of a base station and a UE for estimating a channel according to a selectively requested TRS length, according to embodiments.

A base station 110 may transmit a TRS (not shown) so that the UE 120 performs (e.g., for use by the UE 120 in performing) channel tracking. The UE 120 may receive the TRS (e.g., a first TRS) and may estimate time and frequency tracking, delay spread, and/or Doppler spread by using (e.g., based on) the received TRS. The TRS may be allocated to 52 RBs or a BWP length (e.g., the first TRS may have a first frequency length of 52 RBs, or a first frequency length equal or similar to the BWP length). The TRS may denote that a CSI-RS based on density 3 is mapped to two consecutive slots. Also, in the TRS, each of the two consecutive slots may include two symbols.

In operation S100, the UE 120 may identify a frequency length of the TRS (e.g., the first frequency length of the first TRS) based on a channel state (e.g., based on the estimated time and frequency tracking, delay spread and/or Doppler spread). The frequency length of the TRS may be a BWP length (or may be shorter than the BWP length).

In operation S110, the UE 120 may transmit a message (the message may be termed a frequency length change request message, a TRS frequency length change request message, etc.), requesting the TRS having the BWP length (e.g., a second TRS having a second frequency length), to the base station 110. For example, when the identified frequency length of the TRS (e.g., the first frequency length of the first TRS) is less than the BWP length, the UE 120 may transmit a message requesting the TRS having the BWP length (e.g., the second TRS having the second frequency length). The UE 120 may transmit a TRS request message having the BWP length (e.g., a TRS request message requesting the second TRS having the second frequency length) to the base station 110 by using a higher signaling message. The TRS request message having the BWP length, like the CSI-RS request message described above, may be included in UE assistance information (e.g., in a UE assistance information message) which is an RRC parameter.

Also, the TRS request message having the BWP length may be included in UE capability information (e.g., in a UE capability information message) which is an RRC parameter. For example, the TRS request message having the BWP length may be included in an MIMO-ParametersPerBand information element. For example, the TRS request message may be included in a CSI-RS-ForTracking parameter.

The base station 110 may allocate the TRS having the BWP length to the UE 120 by using the TRS request message.

In operation S120, the base station 110 may generate the TRS having the BWP length. The base station 110 may transmit the generated TRS having the BWP length (e.g., the second TRS having the second frequency length) to the UE 120. In operation S130, the UE 120 may receive the TRS having the BWP length from the base station 110. In operation S140, the UE 120 may perform time and frequency tracking by using the received TRS. In detail, the UE 120 may estimate delay spread and/or Doppler spread by using the received TRS. Maximum (or highest) delay spread may be estimated by searching for a fast arrival path (FAP) and a last arrival path (LAP) in a power delay profile (PDP). The TRS may be allocated by 52 RBs or the BWP length. A channel in a CIR domain of the TRS may be expressed as in the following Equation 5.

$$\tilde{h}[n] = \frac{1}{\sqrt{N_{IFFT}^{TRS}}} \sum_{k=0}^{N_{IFFT}^{TRS}-1} H[4k] e^{\frac{j2\pi kn}{N_{IFFT}^{TRS}}}$$

$$= \frac{1}{\sqrt{N_{IFFT}^{TRS}}} \sum_{k=0}^{N_{IFFT}^{TRS}-1} \frac{1}{\sqrt{N_{FFT}^{BW}}} \sum_{l=0}^{N_{FFT}^{BW}-1} h[l] e^{-\frac{j2\pi(4k)l}{N_{FFT}^{BW}}} e^{\frac{j2\pi kn}{N_{IFFT}^{TRS}}}$$

$$= \frac{1}{\sqrt{N_{IFFT}^{TRS} N_{FFT}^{BW}}} \sum_{l=0}^{N_{FFT}^{BW}-1} h[l] \sum_{k=0}^{N_{IFFT}^{TRS}-1} e^{\frac{j2\pi k(n-4l/Q)}{N_{IFFT}^{TRS}}}$$

$$= \frac{1}{\sqrt{N_{IFFT}^{TRS} N_{FFT}^{BW}}} \sum_{i=0}^{Q-1} h\left[\frac{4n}{Q} + N_{IFFT}^{TRS} i\right]$$

[Equation 5]

$\tilde{h}[n]$ may denote a channel in the CIR domain of the TRS. $N_{IFFT}^{TBS}$ may denote an IFFT size used when the TRS is transformed into a time domain through an IFFT. $N_{FFT}^{BW}$ may denote an FFT size of a system bandwidth. Q may denote a size of to $N_{IFFT}^{TRS}$ to $N_{FFT}^{BW}$. That is, Q may be expressed as in the following Equation 6.

$$Q = \frac{N_{FFT}^{BW}}{N_{IFFT}^{TRS}} \quad \text{[Equation 6]}$$

A channel in a OR domain of a TRS, where a system bandwidth is 100 MHz, an SCS is 30 kHz, and a BWP length is allocated by 273 RBs, may be expressed as in the following Equation 7.

$$\tilde{h}^{273RB}[n] = \frac{1}{2048}\sum_{i=0}^{3} h[n + 1024i] \quad \text{[Equation 7]}$$

On the other hand, a channel in a OR domain of a TRS to which 52 RBs are allocated may be expressed as in the following Equation 8.

$$\tilde{h}^{52RB}[n] = \frac{1}{1024}\sum_{i=0}^{15} h[4n + 256i], \quad \text{[Equation 8]}$$

When a BWP length is 273 RBs, in a case where a TRS is allocated to 273 RBs, the UE 120 may relatively accurately calculate maximum (or highest) delay spread. However, when a TRS is allocated to 52 RBs, it may be difficult for the UE 120 to accurately estimate maximum (or highest) delay spread of a channel.

In operation S150, the UE 120 may transmit a TRS report message to the base station 110. For example, the UE 120 may transmit, as a TRS report, tracking information about a channel and information about at least one of delay spread and Doppler spread to the base station 110.

Figure 10:
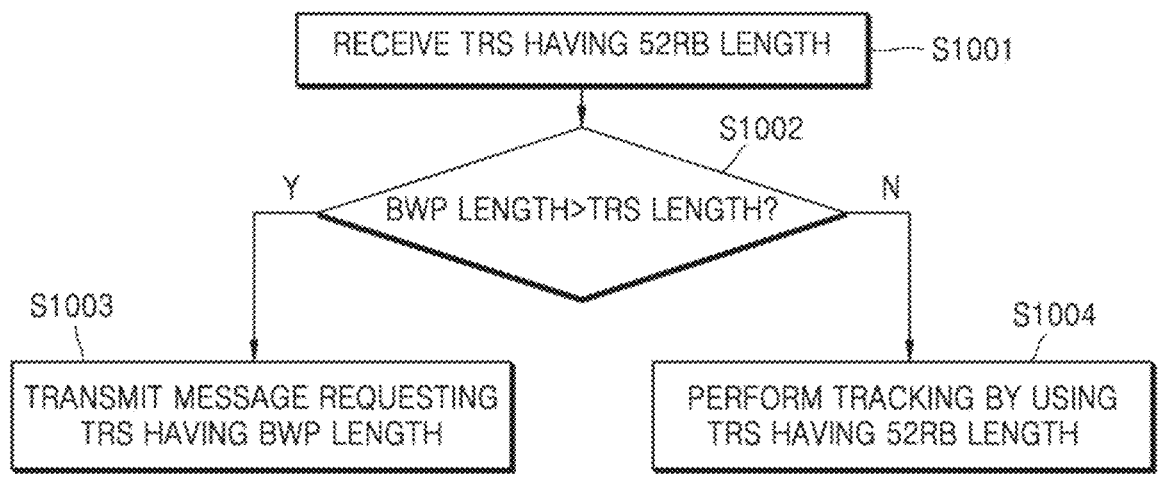
FIG. 10 illustrates an operating process of a UE for estimating a channel according to a selectively requested TRS length according to embodiments.

FIG. 10 illustrates an operating process of a UE for estimating a channel according to a selectively requested TRS length according to embodiments.

In operation S1001, a UE (e.g., the UE 120 of FIG. 1) may receive a TRS, allocated to 52 RBs, from a base station (e.g., the base station 110 of FIG. 1).

In operation S1002, the UE 120 may compare a frequency length of a BWP with a frequency length of the TRS.

In operation S1003, when a length (e.g., frequency length) of a BWP is greater than that of the received TRS (e.g., the TRS of 52 RBs) (Y in operation S1002), the UE 120 may determine a TRS frequency length as a BWP length. The UE 120 may transmit a message, requesting a TRS having the BWP length (e.g., a TRS having a frequency length equal or similar to the BWP length), to the base station 110.

In operation S1004, when the length (e.g., frequency length) of the BWP is not greater than that of the received TRS (e.g., the TRS of 52 RBs) (N in operation S1002), the UE 120 may perform time/frequency tracking by using the TRS of 52 RBs.

Figure 11:
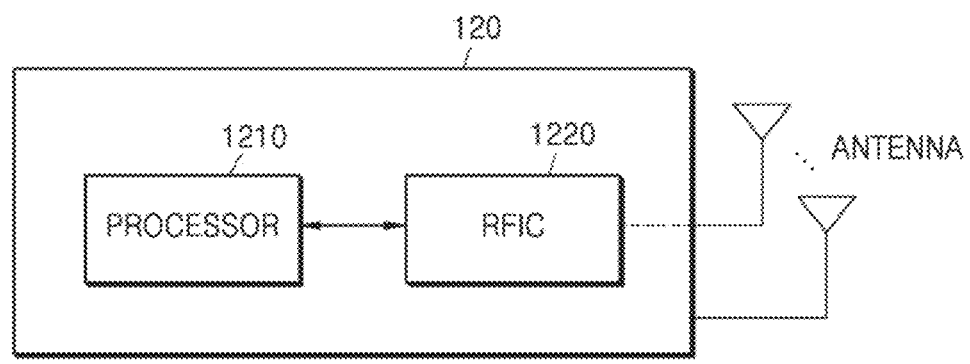
FIG. 11 is a block diagram illustrating a UE according to embodiments.

FIG. 11 is a block diagram illustrating a UE according to embodiments.

Referring to FIG. 11, a wireless communication device 120 may include one or more processors 1210 and/or one or more radio frequency integrated circuits (RFICs) 1220. The one or more processors 1210 may control the one or more RFICs 1220, and may be configured to implement an operating method and operation sequences of the wireless communication device 120 according to embodiments. The wireless communication device 120 may include a plurality of antennas, and the one or more RFICs 1220 may transmit and receive a wireless signal through one or more of the plurality of antennas. At least some of the plurality of antennas may correspond to a transmission antenna(s). The transmission antenna(s) may transmit the wireless signal to an external device (for example, another UE or base station (BS) external to the wireless communication device 120). At least some of the plurality of antennas may correspond to a reception antenna(s). The reception antenna(s) may receive the wireless signal from the external device.

For example, the one or more RFICs 1220 may receive CSI-RS configuration information, including time and frequency location information about a multi-port CSI-RS based on at least one of density 0.5, 1, and 3, from the base station. The one or more RFICs 1220 may receive the multi-port CSI-RS based on at least one of the density 0.5, 1, and 3 from the base station, based on the CSI-RS configuration information. The one or more processors 1210 may estimate a channel between the wireless communication device 120 and a base station (e.g., the base station 110) based on the multi-port CSI-RS. The one or more RFICs 1220 may transmit a multi-port CSI-RS report, based on the estimated channel, to the base station 110.

Figure 12:
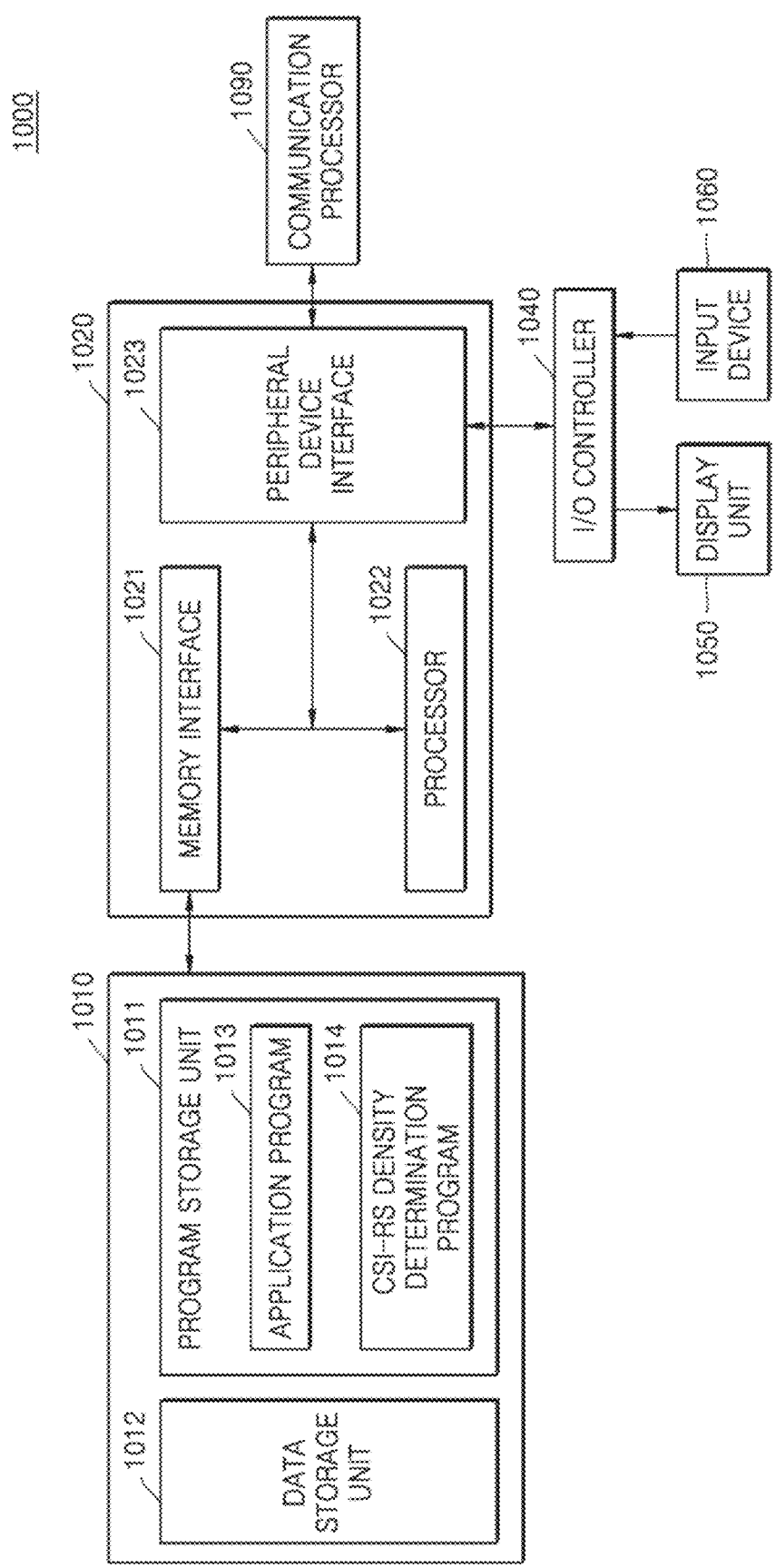
FIG. 12 is a block diagram illustrating an electronic device according to embodiments.

FIG. 12 is a block diagram illustrating an electronic device 1000 according to embodiments. Referring to FIG. 12, the electronic device 1000 may include a memory 1010, a processor unit 1020, an input/output (I/O) controller 1040, a display unit 1050, an input device 1060, and/or a communication processor 1090. Here, the memory 1010 may be provided in plurality. Each of these elements will be described below. According to embodiments, the base station 110 and/or the UE 120 may be implemented using the electronic device 1000.

The memory 1010 may include a program storage unit 1011, which may store a program for controlling an operation of the electronic device 1000, and/or a data storage unit 1012 which may store data generated in executing the program. The data storage unit 1012 may store data used for an operation of each of an application program 1013 and/or a CSI-RS density determination program 1014. The program storage unit 1011 may store the application program 1013 and the CSI-RS density determination program 1014. Here, a program included in the program storage unit 1011 may be a set of instructions and may be referred to as an instruction set.

The application program 1013 may include an application program which is executed in the electronic device 1000. That is, the application program 1013 may include an instruction of an application driven by a processor 1022. The CSI-RS density determination program 1014 may determine a density of a CSI-RS according to embodiments. Also, the CSI-RS density determination program 1014 may determine a length of a TRS.

A peripheral device interface 1023 may control a connection between an I/O peripheral device of a base station to both the processor 1022 and a memory interface 1021. The processor 1022 may perform control so that the base station provides a corresponding service, based on at least one software program. In this case, the processor 1022 may execute at least one program stored in the memory 1010 to provide a service corresponding to a corresponding program.

The I/O controller 1040 may provide an interface between the peripheral device interface 1023 and an I/O device including the display unit 1050 and/or the input device 1060. According to embodiments, the display unit 1050 may be implemented using a display, a monitor, a television, etc. The display unit 1050 may display state information, an input character, a moving picture, and/or a still picture. For example, the display unit 1050 may display application program information driven by the processor 1022.

The input device 1060 may provide input data, generated by a selection of the electronic device 1000, to the processor unit 1020 through the I/O controller 1040. In this case, the input device 1060 may include a keypad including at least one hardware button, a touch pad which senses touch information, etc. For example, the input device 1060 may provide the processor 1022 with touch information, such as a touch, touch motion, and/or a touch release each sensed through the touch pad, through the I/O controller 1040. The electronic device 1000 may include the communication processor 1090 which performs a communication function for voice communication and/or data communication.

Conventional devices and methods for estimating a channel (e.g., a wireless communication channel) estimate the channel based on a channel state information-reference signal (CSI-RS) received from another device (e.g., a base station) after passing through the channel. The conventional devices and methods report feedback information to the other device based on the channel estimation. The CSI-RS corresponds to (e.g., is transmitted with, has, etc.) a density having a value of 0.5, 1 or 3. In cases in which channel delay is higher, and the CSI-RS density is lower (e.g., having a value of 0.5 or 1), the conventional devices and methods are unable to estimate the channel with sufficiently high accuracy.

However, according to embodiments, improved devices and methods are provided for estimating a channel (e.g., a wireless communication channel). For example, the improved devices and methods may request a CSI-RS having a higher density (e.g., having a value of 3) based on a channel estimation performed using another CSI-RS (e.g., based on a determined channel delay or delay spread). The improved devices and methods may subsequently estimate the channel based on the CSI-RS having the higher density. Accordingly, the improved devices and methods overcome the deficiencies of the conventional devices and methods to at least improve the accuracy of the channel estimate (and corresponding feedback information).

Also, conventionally, CSI-RSs having a density value of 3 are transmitted through only a single antenna port. However, according to embodiments, improved devices and methods are provide for communicating (e.g., transmitting and receiving) multi-port CSI-RSs having the density value of 3.

According to embodiments, operations described herein as being performed by the base station 110, the wireless communication device 120 (also referred to herein as the UE 120), the one or more processors 1210, the one or more RFICs 1220, the electronic device 1000, the processor unit 1020, the I/O controller 1040, the display unit 1050, the input device 1060, the communication processor 1090, the application program 1013, the CSI-RS density determination program 1014, the processor 1022, the peripheral device interface 1023, and/or the memory interface 1021 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium (e.g., the memory 1010, the program storage unit 1011 and/or the data storage unit 1012). A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order. As used herein the term "and/or" includes any and all combinations of one or more of the associated listed items.

Hereinabove, embodiments have been described in the drawings and the specification. Embodiments have been described by using the terms described herein, but these have been merely used for describing the inventive concepts and have not been used for limiting a meaning or limiting the scope of the inventive concepts defined in the following claims. Therefore, it may be understood by those of ordinary skill in the art that various modifications and embodiments may be implemented from the inventive concepts. Accordingly, the spirit and scope of the inventive concepts may be defined based on the spirit and scope of the following claims.

While the inventive concepts have been particularly shown and described with reference to embodiments thereof, it will be understood that various changes in form and details may be made therein without departing from the spirit and scope of the following claims.

What is claimed is:

1. An operating method of a user equipment (UE), the operating method comprising:
receiving channel state information-reference signal (CSI-RS) configuration information from a base station, the CSI-RS configuration information including time and frequency location information of a first CSI-RS, and the first CSI-RS corresponding to a first density value of 0.5, 1 or 3;

determining whether to request a second CSI-RS having a second density value based on a comparison between a first delay spread and a reference value, the second density value being different from the first density value, the first delay spread corresponding to a channel between the UE and the base station, and the first delay spread being determined from the first CSI-RS;

transmitting a CSI-RS density change request message to the base station in response to determining to request the second CSI-RS;

receiving the second CSI-RS from the base station based on the CSI-RS configuration information, the second CSI-RS being based on the CSI-RS density change request message;

estimating the channel based on the second CSI-RS to obtain a channel estimate; and transmitting a CSI-RS report to the base station, the CSI-RS report being based on the channel estimate.

2. The operating method of claim 1, wherein the second density value is 3; and the receiving the second CSI-RS includes receiving the second CSI-RS based on a plurality of antenna ports.

3. The operating method of claim 2, wherein the CSI-RS report comprises at least one of:

a precoding matrix indicator (PMI) corresponding to the second CSI-RS; or a rank indicator (RI) corresponding to the second CSI-RS.

4. The operating method of claim 1, wherein the transmitting the CSI-RS density change request message includes transmitting the CSI-RS density change request message based on a UE capability information message.

5. The operating method of claim 1, wherein the transmitting the CSI-RS density change request message includes transmitting the CSI-RS density change request message based on a UE assistance information message.

6. The operating method of claim 1, wherein the first delay spread is a delay spread of the first CSI-RS; and the determining whether to request the second CSI-RS comprises determining to request the second CSI-RS based on the first delay spread being less than the reference value, the first CSI-RS being received based on a multi-path, and the second density value being greater than the first density value.

7. The operating method of claim 1, wherein the estimating the channel comprises:

measuring a first power related to noise in a time domain with respect to the second CSI-RS;

measuring a received power of the second CSI-RS; and calculating a received signal received power (RSRP) of the second CSI-RS by excluding the first power from the received power.

8. The operating method of claim 7, wherein the CSI-RS report comprises at least one of a layer1-reference signal received power (L1-RSRP) or a layer1-signal to noise ratio (L1-SINR).

9. An operating method of a user equipment (UE), the operating method comprising:

determining whether to request a first tracking reference signal (TRS) having a first frequency length based on a comparison between a previous frequency length and a reference value, the previous frequency length being based on a delay spread, the delay spread corresponding to a channel between the UE and a base station, and the previous frequency length being of a previously received TRS;

transmitting a frequency length change request message to the base station in response to determining to request the first TRS;

receiving the first TRS having from the base station, the first TRS having the first frequency length, and the first frequency length being different from the previous frequency length of the previously received TRS; and performing time and frequency tracking based on the first TRS.

10. The operating method of claim 9, wherein the first frequency length is a bandwidth part (BWP) length.

11. The operating method of claim 9, wherein the transmitting the frequency length change request message includes transmitting the frequency length change request message based on a UE capability information message.

12. The operating method of claim 9, wherein the transmitting the frequency length change request message includes transmitting the frequency length change request message based on a UE assistance information message.

13. A user equipment (UE), comprising:

processing circuitry configured to receive channel state information-reference signal (CSI-RS) configuration information from a base station, the CSI-RS configuration information including time and frequency location information of a first CSI-RS, and the first CSI-RS corresponding to a first density value of 0.5, 1 or 3, determine whether to request a second CSI-RS having a second density value based on a comparison between a first delay spread and a reference value, the second density value being different from the first density value, the first delay spread corresponding to a channel between the UE and the base station, and the first delay spread being determined from the first CSI-RS, transmit a CSI-RS density change request message to the base station in response to determining to request the second CSI-RS, receive the second CSI-RS from the base station based on the CSI-RS configuration information, the second CSI-RS being based on the CSI-RS density change request message, estimate the channel based on the second CSI-RS to obtain a channel estimate, and transmit a CSI-RS report to the base station, the CSI-RS report being based on the channel estimate.

14. The UE of claim 13, wherein the second density value is 3; and the processing circuitry is configured to receive the second CSI-RS based on a plurality of antenna ports.

15. The UE of claim 13, wherein the CSI-RS report comprises at least one of:

a precoding matrix indicator (PMI) corresponding to the second CSI-RS; or a rank indicator (RI) corresponding to the second CSI-RS.

16. The UE of claim 13, wherein the processing circuitry is configured to transmit the CSI-RS density change request message based on a UE capability information message.

17. The UE of claim 13, wherein the processing circuitry is configured to transmit the CSI-RS density change request message based on a UE assistance information message.

18. The UE of claim 13, wherein
the first delay spread is a delay spread of the first CSI-RS; and
the processing circuitry is configured to determine whether to request the second CSI-RS based on the first delay spread being less than the reference value, the first CSI-RS being received based on a multi-path, and the second density value being greater than the first density value.

19. The UE of claim 13, wherein the processing circuitry is configured to estimate the channel including:
measuring a first power related to noise in a time domain with respect to the second CSI-RS;
measuring a received power of the second CSI-RS; and
calculating a received signal received power (RSRP) of the second CSI-RS by excluding the first power from the received power.

20. The UE of claim 19, wherein the CSI-RS report comprises at least one of:
a layer1-reference signal received power (L1-RSRP) based on the RSRP of the second CSI-RS; or
a layer1-signal to noise ratio (L1-SINR) based on the RSRP of the second CSI-RS.

\* \* \* \* \*